UNITED STATES PATENT OFFICE.

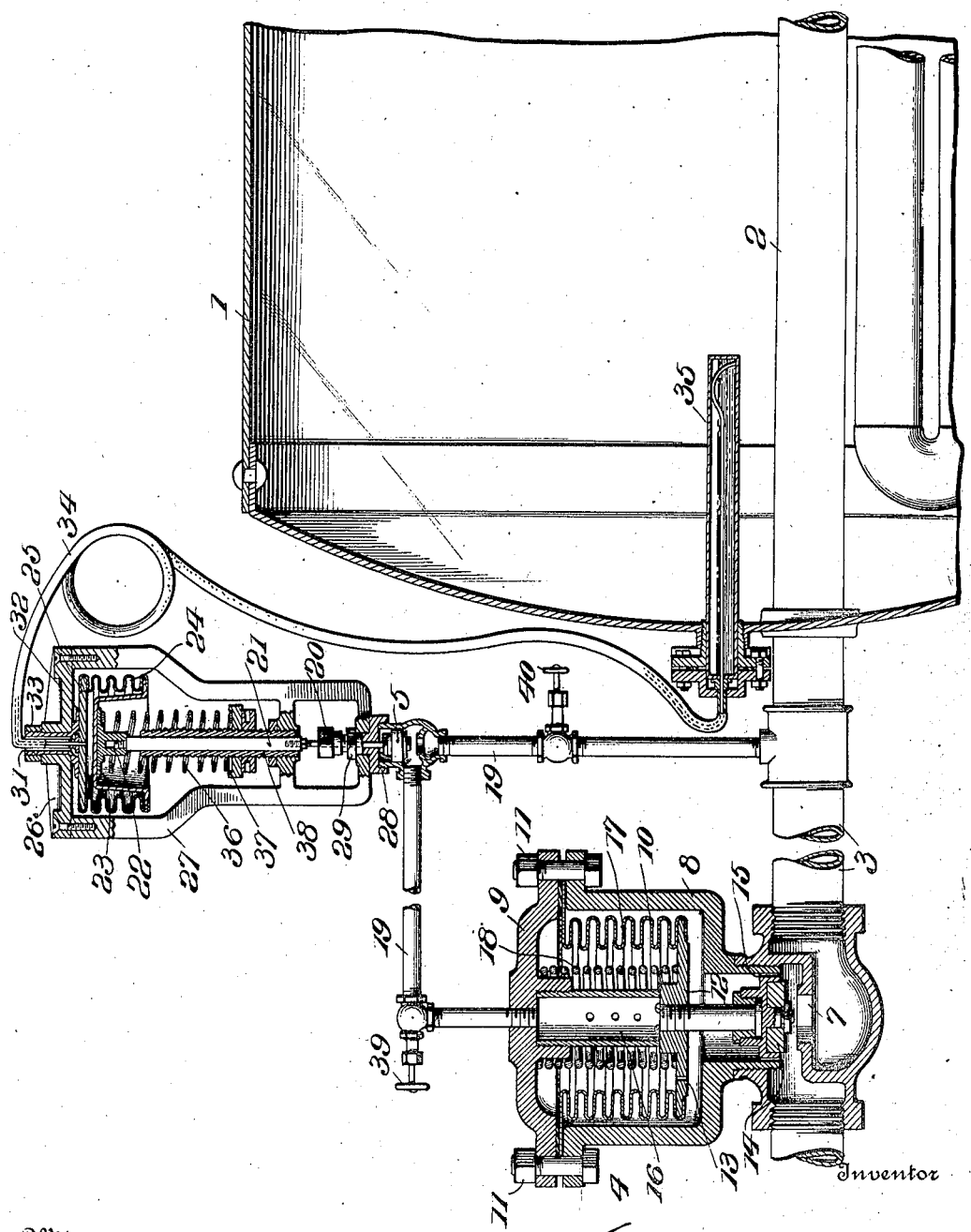

WESTON M. FULTON, OF KNOXVILLE, TENNESSEE, ASSIGNOR TO THE FULTON COMPANY, OF KNOXVILLE, TENNESSEE, A CORPORATION OF MAINE.

TANK-REGULATOR.

1,328,277.

Specification of Letters Patent.

Patented Jan. 20, 1920.

Application filed June 26, 1914. Serial No. 847,486.

*To all whom it may concern:*

Be it known that I, WESTON M. FULTON, a citizen of the United States, and a resident of Knoxville, Tennessee, have invented a new and useful Improvement in Tank-Regulators, which invention is fully set forth in the following specification.

This invention relates to thermosensitively controlled devices for regulating the supply of a heating fluid to a tank or other reservoir for containing a medium to be heated and maintained in heated condition, and more particularly to devices of this class in which variations of temperature of the medium heated, such as water in a hot-water tank, sensitively control the supply of such heating fluid.

Heretofore, the supply of the heating fluid, such as steam, to the heating coils in a hot-water or other liquid-containing tank has been regulated by means of a thermostatic device located in the hot-water tank and acting either directly on a valve in the steam supply pipe or indirectly on said valve through the agency of compressed air or a head of water maintained independently of the source of pressure in the heating conduits. In the first arrangement, it is usually necessary to use a balanced valve in the steam conduit to lighten the work of the thermostat. This arrangement introduces constructional difficulties from the use of balanced valves and does not secure the sensitiveness of control which is often desired. In the second arrangement, a supplemental source of power is required to be maintained and this in many situations is not economical and sometimes not possible.

My invention has for its object to overcome the above objections and resides broadly in providing a fluid-pressure valve subject to either inlet or outlet pressure in the conduit conducting heating fluid to the tank or other reservoir and controlling this valve by a pilot valve which is operated by a sensitive thermostatic device in heat interchanging relation with the medium in said tank or other reservoir. With the thermostatically-operated pilot valve may be employed hand-operated valves for controlling the fluid-pressure valve, with the view of permitting disconnection of the thermosensitive device to enable repairs to the latter without interrupting the use of the heating system.

In carrying out my invention, I may use any suitable form of pressure-operated valve and any suitable form of thermosensitive device, but I prefer to use a thermostatic device such as described and claimed in my Patent No. 1,102,035, granted June 30, 1914, as herein partially illustrated; and for the pressure-operated valve I prefer to use the type of pressure-operated valve described and claimed in my Patent No. 1,176,535, granted March 21, 1916, one constructional form of which is herein shown and described.

My invention will be described, by way of example, in connection with a hot-water tank wherein variations of temperature in the water to be heated sensitively affect the thermosensitive means which operates the pilot valve, said pilot valve in turn effecting the actuation of said pressure-operated valve to control the flow of heating fluid through the heating coils located in the tank when the variations in temperature of the water in said tank require it. It is to be understood, however, that I do not limit my invention to this particular use, as it is capable of use in controlling the flow of heating fluid to tanks or reservoirs for maintaining a medium in heated condition used in other relations.

In order that the invention may be readily understood, reference is had to the accompanying drawings which illustrate one mechanical embodiment of the inventive idea, and which are intended to assist the description of the invention but not to define the limits thereof.

In the drawings, 1 designates a tank in which water or other liquid is to be heated by a heating medium circulated through conduit 2 and supplied through a conduit 3 in which is located a pressure-operated valve device 4 adapted to be operated by the pressure of the heating fluid in said conduit and to be controlled by a pilot valve 5 adapted to be operated by sensitive thermostatic means subject to variations of temperature of the liquid in the tank. The pressure-operated valve in the construction illustrated is of the form described and claimed in my Patent No. 1,176,535, granted March 21, 1916, and, briefly stated, comprises a valve casing having a partition provided with a valve seat or opening 7 on the high pressure side of the partition. In the side wall of the valve casing is provided a threaded opening into which is screwed the neck of a casing 8, the flanged upper end of which is closed by a flanged cover 9. Between these flanges is clamped a flexible wall shown as in the form of a corrugated collapsible and expansible vessel 10, together with a suitable packing ring, by means of bolts 11. The lower end of this vessel is provided with an inflexible end wall 12 having a vent opening 13, and in a thickened central portion of the end wall is secured a valve stem which terminates in a valve 14 adapted to control opening 7. Through channels 15, between the valve body and neck of casing 8, and the vent 13, the heating fluid has free access to the interior of vessel 10. Secured to the under side of cover 9 in the form shown is a depending perforated tube 16 which serves to limit the collapse of the vessel and to conduct fluid out of the vessel. Around this tube is a spring 18, the ends of which receive suitable retaining projections extending from the cover 9 and end wall 12. The interior of vessel 10 communicates through tube 16 and a by-pass conduit 19 with the heating fluid conduit 3 on the low-pressure side of the valve. In this conduit 19 is the pilot valve 5, the valve stem of which passes through a packing box 20 and is connected to a rod 21 which is shown as threaded into a socket 22 secured to the end closure 23 of the collapsible and expansible vessel 24. The end wall of this vessel is preferably reëntering and acts to limit the collapse of the vessel by contacting with the upper end closure 25 of the vessel. This closure 25 is supported from a top member 26 of a frame 27 which rests on the cap 28 of the pilot valve casing and is made secure thereto by a clamp nut 29. The means illustrated for securing the closure 25 to member 26 consists of a sleeve 31 having a flange 32 at its lower end fast to the closure 25. The sleeve passes through a tubular opening in member 26 and is held in place by a nut 33. This sleeve is also adapted to receive the end of an armored tube 34 which is adapted to make a tight joint with the end closure 25 and form a means of communication between vessel 24 and a thermosensitive bulb 35 partly filled with a volatile liquid and projecting into the tank 1. For the purpose of regulating the thermostat a spring 36 is inserted between end closure 23 and an adjustable nut 37 working on a sleeve 38 supported by a cross member of the frame 27. The thermostat illustrated is of the type described and claimed in my Patent No. 1,102,035, granted June 30, 1914, but it is to be expressly understood that the invention is not to be limited to the use of this particular thermostat, as any other suitable sensitive thermostatic device may be employed in place thereof. Hand valves 39 and 40 may be also included in the by-pass conduit 19 to permit regulation when it is necessary to disconnect the pilot valve.

The operation of the device as described is as follows: Assume that all the valves are open, as shown in the drawings. The heating fluid flows in the conduit 3 from left to right into the heating conduit in the tank. When the water or other liquid in the tank reaches the predetermined temperature for which the thermosensitive device is set, the vapor in bulb 35 forces liquid into the vessel 24 thereby causing the end wall 23 and the valve 5 connected therewith to descend. When valve 5 is seated, communication between vessel 10 in the automatic valve device 4 and conduit 3 is cut off. Thereupon, fluid pressure is built up in vessel 10 through vent 13 until the fluid pressure on opposite sides of the wall 12 becomes substantially equal. The vessel 10 under action of spring 18 then extends and seats valve 14, thereby cutting off supply of heating fluid to the tank. When the temperature of the liquid in the tank lowers below that for which the thermostatic device is set, vessel 24 contracts and lifts valve 5, again opening the by-pass conduit. If vessel 24 continues to contract so that the opening provided by valve 5 becomes materially larger than vent 13, as will be the case if the flow of steam past valve 5 at the first opening thereof is not sufficient to compensate for the drop of temperature of the liquid in the tank, the pressure in vessel 10 is then vented into conduit 3 where the pressure is lower. The pressure on the outside of vessel 10 then exceeds that on the inside and collapses the walls of the latter against the opposing spring 18, and valve 14 again opens to admit heating fluid to the heating conduit in the tank. If the drop of temperature is small and gradual, however, the flow of steam past the valve 5, before the latter has opened sufficiently to vent the vessel 10, may be sufficient to maintain the liquid in the tank at the desired temperature. In this manner the temperature of the liquid in the tank is maintained between narrow limits.

It will also be seen from this construction that the thermosensitively controlled pilot valve device may be readily disconnected from the by-pass conduit for repairs. The casing of the valve may be closed by a plug or other means and the hand valves 39 and 40 then used for regulation without cutting off the supply of heating fluid to the tank. Furthermore, the pilot valve device may be standardized as it is capable of use with any size of pressure-operated valve, thereby enabling the device to be made as a unit and with economy.

What is claimed is:—

1. In a device of the character described, a hot-water tank provided with a conduit for supplying a heating medium thereto, a valve in said conduit, a by-pass for conveying heating medium around said valve, an extensible and contractible wall connected to said valve and provided with a vent constituting a means of communication between said conduit and said by-pass, a pilot valve in said by-pass, an extensible and collapsible vessel having a movable end wall connected to said pilot valve, and a thermosensitive bulb in communication with said vessel and subjected to the temperature of the water in said tank.

2. In a device of the character described, a hot-water tank provided with a conduit for supplying a heating medium thereto, a valve in said conduit, a by-pass for conveying heating medium around said valve, an extensible and contractible wall connected to said valve and provided with a vent constituting a means of communication between said conduit and said by-pass, a spring for closing said valve when pressure accumulates on the inner side of said wall, a pilot valve in said by-pass, and sensitive thermostatic means connected to said pilot valve and subjected to the temperature of the water in said tank.

3. In a device of the character described, a hot water tank provided with a conduit for supplying a heating medium thereto, a valve in said conduit, a by-pass for conveying heating medium around said valve, an extensible and contractible wall connected to said valve and provided with a vent constituting a means of communication between said conduit and said by-pass, a pilot valve in said by-pass, and sensitive thermostatic means connected to said pilot valve and subjected to the temperature of the water in said tank.

4. In a device of the character described, a tank for containing a heated fluid and provided with a conduit for circulating a heating medium therethrough, a valve in said conduit, a flexible wall connected to said valve, a by-pass for conveying heating medium around said valve and comprising a vent between said conduit and the inner side of said wall, a spring for closing said valve when pressure accumulates on the inner side of said wall, a pilot valve in said by-pass, and sensitive thermostatic means connected to said pilot valve and subjected to the temperature of the fluid in said tank, whereby said pilot valve is sensitively operated in response to temperature variations in the fluid in said tank.

5. In a device of the character described, a tank for containing a heated fluid and provided with a conduit for circulating a heating medium therethrough, a valve in said conduit, a movable wall connected to said valve, a by-pass for conveying heating medium around said valve and comprising a vent between said conduit and the inner side of said wall, a pilot valve in said by-pass, and sensitive thermostatic means connected to said pilot valve and subjected to the temperature of the fluid in the tank, whereby said pilot valve is sensitively operated in response to temperature variations in the fluid in said tank.

6. In a device of the character described, in combination with a tank for containing a heated fluid and provided with a conduit for circulating a heating medium therethrough, means sensitively effective to normally maintain said fluid at a substantially uniform temperature comprising a valve in said conduit, a movable wall connected to said valve, a by-pass around said valve and comprising a vent between said conduit and the inner side of said wall, a valve in said by-pass, and thermostatic means subjected to the temperature of the fluid in said tank, said thermostatic means being connected to said last-named valve and actuating the same in accordance with temperature variations in the fluid in said tank.

In testimony whereof I have signed this specification in the presence of two subscribing witnesses.

WESTON M. FULTON.

Witnesses:
 B. A. TRIPP,
 HINES S. MCCOY.